United States Patent [19]

Thiel

[11] Patent Number: 5,090,549
[45] Date of Patent: Feb. 25, 1992

[54] CONVEYOR SYSTEM

[75] Inventor: Hans-Joachim Thiel, Rheurdt, Fed. Rep. of Germany

[73] Assignee: Krupp Industrietechnik Gesellschaft mit beschränkter Haftung, Duisburg, Fed. Rep. of Germany

[21] Appl. No.: 592,347

[22] Filed: Oct. 3, 1990

[30] Foreign Application Priority Data

Oct. 12, 1989 [DE] Fed. Rep. of Germany ....... 3934053

[51] Int. Cl.$^5$ .............................................. B65G 21/10
[52] U.S. Cl. .................................. 198/312; 198/314; 198/317; 198/318
[58] Field of Search ............... 198/311, 312, 303, 317, 198/318, 314

[56] References Cited

U.S. PATENT DOCUMENTS

| | | | |
|---|---|---|---|
| 3,598,224 | 8/1971 | Oury | 198/311 X |
| 3,744,615 | 7/1973 | Plaquet et al. | 198/317 X |
| 4,446,958 | 5/1984 | Dalrymple | 198/314 X |
| 4,489,818 | 12/1984 | Franke et al. | 198/311 |
| 4,924,993 | 5/1990 | Buxton | 198/314 X |

FOREIGN PATENT DOCUMENTS

| | | | |
|---|---|---|---|
| 1280154 | 1/1966 | Fed. Rep. of Germany | . |
| 3009891 | 3/1980 | Fed. Rep. of Germany | . |
| 207525 | 4/1982 | Fed. Rep. of Germany | . |
| 3327202 | 7/1983 | Fed. Rep. of Germany | . |
| 8418558 | 6/1984 | Fed. Rep. of Germany | . |
| 3303731 | 8/1984 | Fed. Rep. of Germany | 198/303 |
| 244111 | 12/1985 | Fed. Rep. of Germany | . |
| 0235235 | 4/1986 | Fed. Rep. of Germany | 198/303 |
| 3521033 | 12/1986 | Fed. Rep. of Germany | . |
| 3627961 | 10/1987 | Fed. Rep. of Germany | 198/312 |
| 3616485 | 11/1987 | Fed. Rep. of Germany | 198/312 |
| 3742009 | 12/1987 | Fed. Rep. of Germany | . |
| 349791 | 11/1972 | U.S.S.R. | 198/312 |
| 88/02731 | 4/1988 | World Int. Prop. O. | 198/317 |

OTHER PUBLICATIONS

Dr. W. Durst; Absetzer für eine Tagesleistung von 240000 m der Rheinischen Braunkohlenwerke—Braunkohle, Heft 8, Aug. 1974, pp. 231–232.
Dr. H. J. Kern; Gestaltung der Übergabeelemente in Bagger Absetzer-Kombination—Neue Bergbautechnik, 18 Jg., Heft 1, Jan. 1988, pp. 18–20.

Primary Examiner—D. Glenn Dayoan
Attorney, Agent, or Firm—Spencer & Frank

[57] ABSTRACT

A conveyor system includes a back arm pivotal about a first vertical axis; a discharge arm pivotal about a horizontal axis and about the first vertical axis; a discharge belt mounted on the discharge arm and extending rearward, beyond the first vertical axis, to the back arm; and a connecting bridge pivotal about second and third vertical axes, and supported on a separate, movable device so as to be longitudinally displaceable. The connecting bridge is articulated to a component of the conveyor system above the back arm. The second vertical axis is spaced from the first vertical axis at a predetermined distance and disposed diametrally opposite a discharge end of the discharge belt with respect to the first vertical axis. There is further provided a connecting belt mounted on the connecting bridge and feeding the discharge belt.

3 Claims, 2 Drawing Sheets

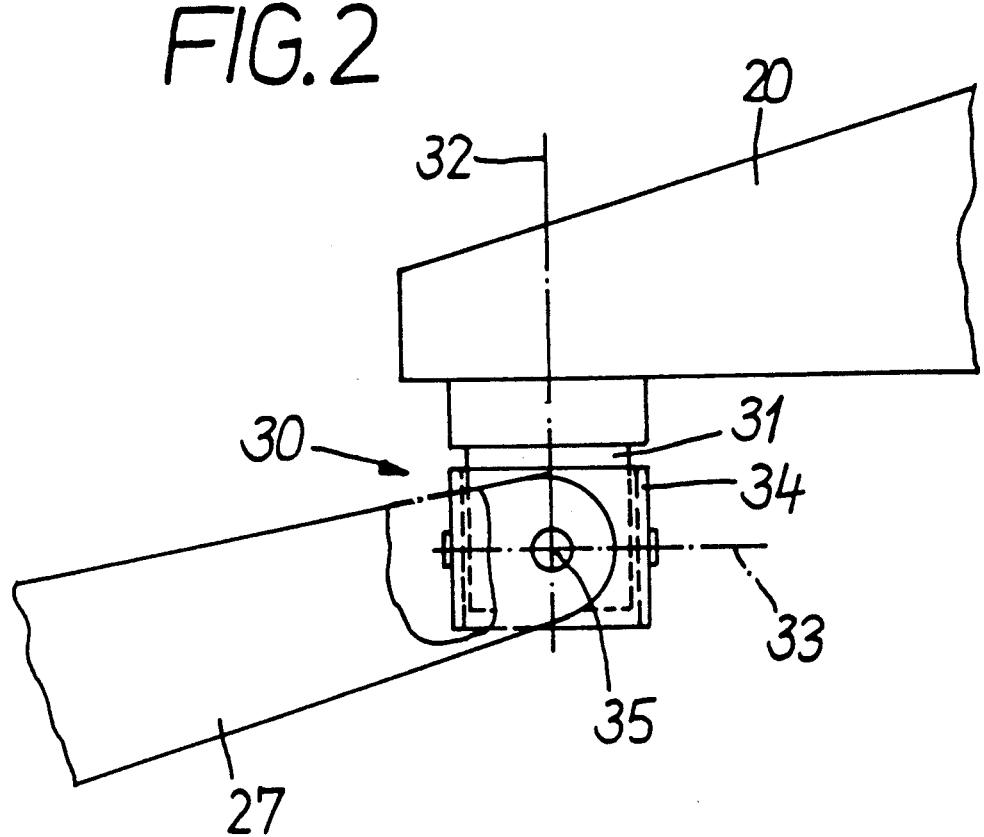
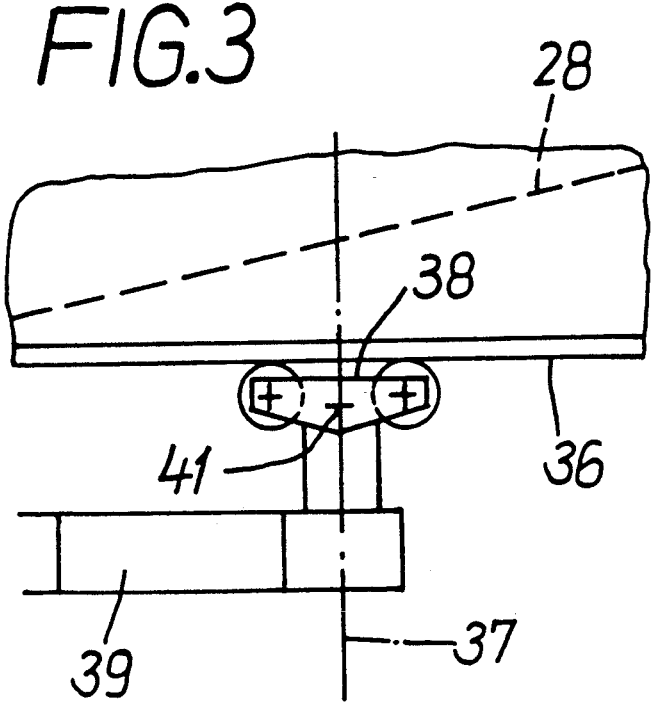

CONVEYOR SYSTEM

CROSS-REFERENCE TO RELATED APPLICATION

This application claims the priority of Federal Republic of Germany Application P 39 34 053.8, filed Oct. 12, 1989, the subject matter of which is incorporated herein by reference.

BACKGROUND OF THE INVENTION

The present invention relates to a conveyor system or stacker including an arm (cantilever) which can be raised and lowered about a horizontal axis and pivots about a vertical axis and is provided with a conveyor discharge belt. The device further includes a back arm (ballast cantilever) which is pivotal about the vertical axis, and a connecting bridge including a connecting conveyor belt that discharges onto the discharge conveyor belt. The connecting bridge is mounted on the conveyor system so as to be pivotal about a vertical axis and, in addition it is longitudinally displaceably supported on a separate, movable device. The German periodical "Braunkohle" 1974/8, page 232 (FIG. 2) discloses a conveyor system or stacker of this type.

The drawbacks of this type of conveyor system or stacker are that it is structurally complicated and very heavy.

SUMMARY OF THE INVENTION

It is therefore an object of the present invention to modify the configuration of a conveyor system or stacker of this general type so that its gross weight is reduced thereby correspondingly reducing the stress on the ground caused by the device.

This is accomplished in the present invention by extending the conveyor discharge belt rearward beyond the vertical axis of the discharge arm up to the back arm; articulating the connecting bridge to the conveyor system above the back arm; spacing the vertical axis about which the connecting bridge is articulated, at a predetermined distance from the vertical axis of the discharge arm; and disposing the vertical axis about which the connecting bridge is articulated diametrally opposite the discharge end of the conveyor discharge belt with respect to the vertical axis of the discharge arm.

With the loading point on the connecting belt remaining the same, the connecting bridge can be made significantly shorter than in the conventional conveyor system or stacker. Due to the articulation, attachment and support of the connecting bridge above the back arm, the mass of the counterweight can be reduced by the amount of weight contributed by the connecting bridge. The present invention results in savings in weight for the entire device as compared to conventional systems for several reasons: because of a shorter and thus lighter connecting belt; because of the reduction of the mass of the counterweight permitted by the novel manner of articulation, and furthermore, because of the fact that no high supporting structure (tower) is required for the back arm (since the connecting bridge is articulated above the back arm, the latter is disposed at a low level).

According to another advantageous feature of the present invention the ratio of the distance between the elevation axes of the articulation and support of the connecting bridge (if arranged to be flush with the discharge arm) to the distance between the vertical axis for pivoting the superstructure and the vertical axis of the articulation of the connecting bridge is at least 0.6 and at most 1.25. As a result of such an arrangement, the connecting bridge is able to pivot unimpededly with the discharge arm when the latter is pivoted.

In order to permit the conveyor system or stacker to change locations independently of other conveying components, the connecting bridge is advantageously supportable by a pressure stressable supporting structure at the back arm.

BRIEF DESCRIPTION OF THE DRAWINGS

FIG. 2 is an enlarged schematic side elevational view of one part of the structure of FIG. 1.

FIG. 3 is an enlarged schematic side elevational view of another part of the structure of FIG. 1.

DETAILED DESCRIPTION OF THE PREFERRED EMBODIMENT

Figure 1:
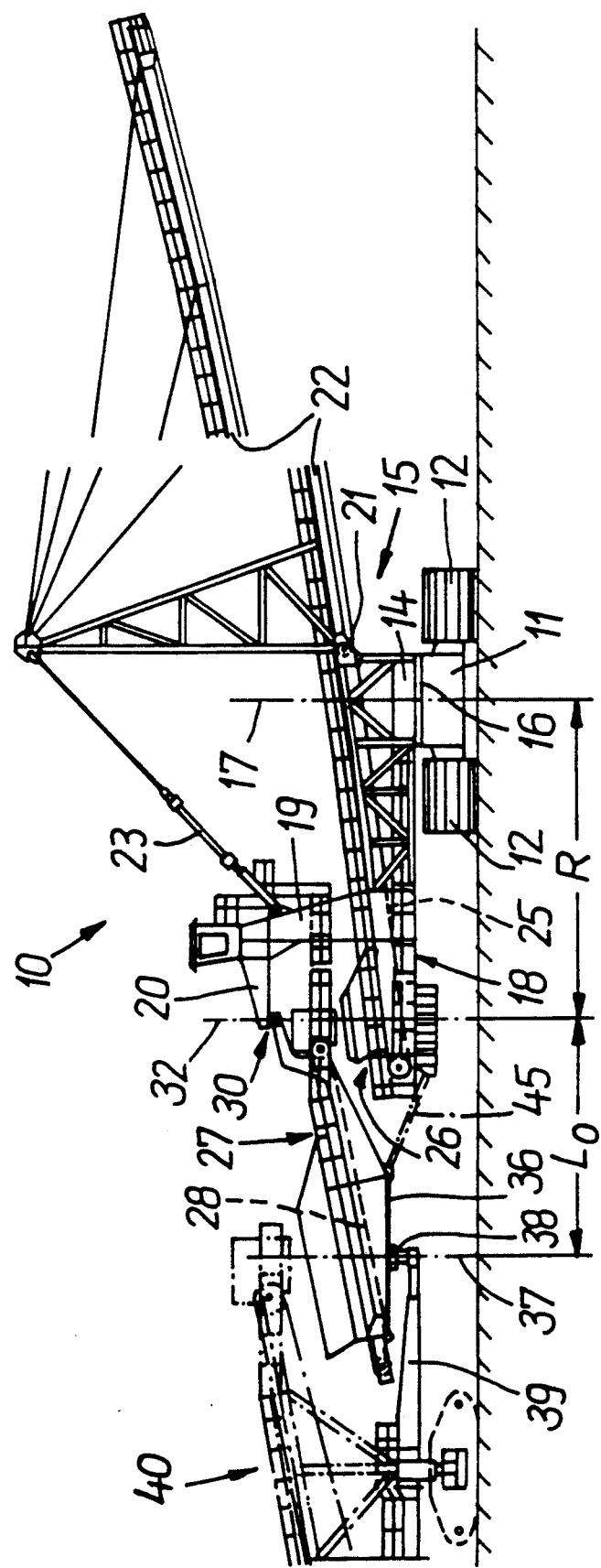
FIG. 1 is a schematic side elevational view of a conveyor system or stacker according to a preferred embodiment of the invention.

With reference to FIG. 1, the conveyor system or stacker 10 includes a substructure 11 which is supported on crawlers 12. The substructure 11 supports a platform 14 and a superstructure 15 of the conveyor system or stacker 10 so that it is able to pivot about a vertical axis 17 by way of a ball bearing slewing rim 16.

Superstructure 15 includes a low-lying back arm 18 to which is attached an upwardly oriented structure 19 equipped with a cantilever arm or gallows 20 and a discharge arm 22 articulated about a horizontal pivot axis 21. The inclination and thus the height of the discharge arm 22 can be varied by means of one or several hydraulic cylinders 23 that are connected with structure 19.

A single, continuous conveyor belt (discharge belt) 25 extends over the entire length of back arm 18 and discharge arm 22. The charging end 26 of the belt 25 is disposed at the end of back arm 18 remote from vertical axis 17.

The upper end of a connecting bridge 27 is articulated to cantilever arm 20 above charging end 26. A feeding or connecting belt 28 is mounted on the connecting bridge 27.

Referring now to FIG. 2, the articulation 30 of connecting bridge 27 is a cardan joint. A component 31 is mounted at cantilever arm 20 so as to pivot about a vertical axis 32. An annular intermediate member 34 is articulated to component 31 and is pivotal about a horizontal axis 33. Connecting bridge 27, in turn, is articulated to the intermediate member 34 so as to be pivotal about a further horizontal axis 35 which is perpendicular to the horizontal axis 33.

Referring now to FIG. 3, the underside of connecting bridge 27 is provided, at the end remote from the articulation 30, with rails 36 with which connecting bridge 27 is held on a roller support 38 that is pivotal about a vertical axis 37. The roller support 38 is held above the cantilever arm 39 of a tripper 40 (see FIG. 1). In order to compensate for differences in height, roller support 38 is also pivotal about a horizontal axis 41. Instead of tripper 40, a supporting carriage may also be employed to support connecting bridge 27.

During lateral pivoting of discharge arm 22 and thus of the rearward back arm 18, the articulation 30 of connecting bridge 27 is pivoted out of the position in which it is flush with the two vertical axes 17 and 37. Thus, the point of contact of rails 36 of connecting bridge 27 above the roller support 38 is displaced further toward the rear. Therefore, rails 36 must extend further to the rear to meet these conditions. The necessary length of the rails toward the rear is determined from the maximum pivot angle of superstructure 15, and the ratio of $L_0$ to R, where $L_0$ is the distance between vertical axes 32 and 37, and R is the distance between vertical axes 17 and 32, when discharge arm 22, back arm 18 and connecting bridge 27 are in mutual alignment.

In order to support connecting bridge 27 if the conveyor system or stacker 10 changes its location, a supporting arrangement 45 is provided (shown in dash-dot lines in FIG. 1) and, in the simplest case, is configured as a pressure or ram bar. Moreover, the supporting arrangement may have a flat shape and may have two points of support for the connecting bridge and back arm 18 in order to prevent inadvertent pivoting of the connecting bridge.

It will be understood that the above description of the present invention is susceptible to various modifications, changes, adaptations, and the same are intended to be comprehended within the meaning and range of equivalents of the appended claims.

What is claimed is:

1. A conveyor system comprising:
   a back arm pivotal about a first vertical axis;
   a discharge arm pivotal about a horizontal axis and about the first vertical axis;
   a discharge belt mounted on said discharge arm, the discharge belt extending rearward, beyond the first vertical axis, to the back arm; and
   a connecting bridge pivotal about second and third vertical axes, and supported on a separate, movable device so as to be longitudinally displaceable, the connecting bridge being articulated to a component of the conveyor system above the back arm, the second vertical axis being spaced from the first vertical axis at a predetermined distance and disposed diametrally opposite a discharge end of the discharge belt with respect to the first vertical axis; and
   a connecting belt mounted on said connecting bridge and feeding the discharge belt.

2. A conveyor system defined in claim 1, wherein the ratio of a distance between said second vertical axis and said third vertical axis, to the distance between the first vertical axis and the second vertical axis is between 0.6 and 1.25 when the connecting bridge is in mutual alignment with said back arm and said discharge arm.

3. A conveyor system as defined in claim 1, wherein the connecting bridge is supported against the back arm with a supporting structure.

* * * * *